UNITED STATES PATENT OFFICE.

BRUNO TRENCKMANN, OF SCHÖNEBERG, NEAR BERLIN, GERMANY, ASSIGNOR TO JULIUS SCHMID, OF ASTORIA, NEW YORK.

MANUFACTURE OF PARCHMENT-LIKE SKIN.

No. 915,638.     Specification of Letters Patent.     Patented March 16, 1909.

Application filed June 12, 1907. Serial No. 378,654.

To all whom it may concern:

Be it known that I, BRUNO TRENCKMANN, manufacturer, a subject of the German Emperor, and resident of 8 Mühlenstrasse, in the city of Schöneberg, near Berlin, Germany, have invented new and useful Improvements in the Manufacture of Parchment-Like Skin, of which the following is a specification.

My invention relates to a process of treating the peritoneal membrane of a gut; and it has for its object to produce a waterproof, parchment-like leather.

In the process as usually carried out, the peritoneal membrane of the gut, after having been cleaned of fat and soaked in a bath of soap, is immersed in a bath of sulfate of zinc, chlorid of barium or any similar mineral salts which are able to produce pigments, insoluble in water, by double transposition with any inorganic salts, acids or bases.

My process consists in alternately treating the skins in such baths at certain definite temperatures. For example: the gut membranes are first rinsed from five to ten minutes in a solution of sulfate of zinc, or other mineral salts, of about 15° Baumé and at a temperature of 4° C. It is then brought into a solution of preferably carbonate of sodium of about 15° Baumé and at the same temperature, and treated therein for about the same period of time, raising the temperature, however, to 15° C. It is then returned into another solution of sulfate of zinc at a temperature of 5° C., and thereafter into a solution of carbonate of soda at the same temperature. It is then finally returned to the solution of sulfate of zinc at a temperature of 6° C., and then into a solution of carbonate of soda at the same temperature. This treatment is repeated until the skins have absorbed a sufficient amount of the pigment, which is attained usually after two to three treatments.

By this process a parchment-like, clear, white or well colored product is obtained, which may come in contact with water and when again dry will appear as before. Further this product, contrary to leather, is capable of being extended when soaked, and will again shrink while drying, thus making a perfect tight cap so desirable for closing bottles of all kinds perfectly air-tight.

I claim:—

The herein described process of treating the peritoneal membrane of a gut, consisting in: first, rinsing the membrane in a solution of sulfate of zinc at a temperature of 4° C., and then treating the same in a solution of carbonate of soda at the same temperature, and raising the temperature to 15° C.; then returning the membrane to a solution of sulfate of zinc at a temperature of 5° C., and then treating the same in a solution of carbonate of soda at the same temperature; and finally returning the same to a solution of sulfate of zinc 6° C., and then to a solution of carbonate of soda at the same temperature.

In testimony, that I claim the foregoing as my invention, I have signed my name in presence of two witnesses, this 27th day of May 1907.

BRUNO TRENCKMANN.

Witnesses:
   HENRY HASPER,
   WOLDEMAR HAUPT.